Aug. 19, 1969  B. HOUCHMAN  3,462,078

CONTROL SYSTEM FOR A BAKING OVEN

Filed Oct. 2, 1967

INVENTOR
BOLESLAW HOUCHMAN

BY *Benjamin J. Baird*

ATTORNEY

United States Patent Office 3,462,078
Patented Aug. 19, 1969

3,462,078
CONTROL SYSTEM FOR A BAKING OVEN
Boleslaw Houchman, Rechov Chatam Sopher 11,
Tel Aviv, Israel
Filed Oct. 2, 1967, Ser. No. 672,353
Claims priority, application Israel, Oct. 14, 1966,
26,691
Int. Cl. F23n 1/00; G05d 23/19; F27b 9/02
U.S. Cl. 236—15                     4 Claims

ABSTRACT OF THE DISCLOSURE

A baking oven comprises a plurality of heated zones, a central burner for supplying hot gasses to two or more zones, means for regulating the flow of the hot gasses to each of the zones, a temperature sensitive device in each zone, a control circuit for automatically controlling each of the zone regulating means in response to the temperature sensed in its respective zone, and burner control means for controlling the burner so as to automatically regulate the quantity of hot gasses produced thereby. The control circuit includes a bridge having a pair of resistances controlled by the temperature sensitive device in each zone, one of the resistances being normally included in one arm of the bridge and being shunted therefrom by the actuation of the temperature sensitive device in its respective zone, the other electrical resistance of the pair being in a second arm of the bridge and being controlled by the temperature sensitive device in an opposite manner.

BACKGROUND OF THE INVENTION

Field of the invention

The present invention relates to baking ovens for baking bread, rolls, biscuits, and the like.

Description of the prior art

One known form of baking oven in which the invention may be used includes a tunnel divided into a plurality of heated zones or sections arranged in succession with respect to each other, conveying means (e.g., an endless conveyor belt) for transporting the media to be heated (e.g. bread dough) through the sections, and a central burner for supplying the gasses to the sections. Means are also provided (e.g., a damper for each section, or one common to more than one section) enabling each section to be individually adjusted with respect to the flow of hot gasses therethrough from the central burner.

This type of baking oven may also use two (or more) central burners each burner supplying two or more zones.

In a normal day's operation the baking oven is used for producing a number of batches of bread or other products, e.g., rolls. Each type of product requires that the individual zones be adjusted to a predetermined temperature in accordance with that type. It frequently happens that there are periods in which no dough (or a smaller than usual quantity) is passing through certain zones. The temperatures of such zones tend to rise rapidly unless closely monitored by the operator. The same occurs when the media being heated (e.g. rolls) differs in rate of heat absorption from the media being heated in the preceding batch (e.g. bread loaves). Further, if the supply of hot gasses is reduced to various zones in order to prevent the temperature rise in those zones it soon occurs that the central source of hot gasses produced by the central burner supplies an excess of that required, resulting in a waste of fuel.

This type of oven may also include an arrangement (usually a fan and louvre baffles) for circulating the hot gasses through the various zones. As the heat requirements of the zones are reduced under the conditions discussed in the preceding paragraph, the output of the circulating fan is more than that required, resulting in a waste of power.

SUMMARY OF THE INVENTION

An object of the present invention is to provide improvements in baking ovens of the foregoing type in the respects discussed above.

According to the invention, there is provided a baking oven including a central burner for supplying hot gasses to two or more zones or sections of the heated oven tunnel regulating means for regulating the flow of the hot gasses to each of the zones, a temperature sensitive device in each of these zones, and a control circuit including zone control means for automatically controlling each of the zone regulating means in response to the temperature sensed in its respective zone.

According to a further feature, the control circuit also includes burner control means for controlling the central burner so as to automatically regulate the quantity of the hot gasses produced thereby.

The control circuit, according to a further feature, includes a bridge having a pair of impedances controlled by the temperature sensitive device in each respective zone, one of the pair of impedances being normally included in one arm of the bridge and being shunted therefrom by the actuation of the temperature sensitive device of its respective zone, the other impedance of the pair being normally shunted from a second arm of the bridge and being switched into it upon actuation of the temperature sensitive device of its respective zone.

Further features and advantages of the invention will be apparent from the description below.

BRIEF DESCRIPTION OF THE DRAWINGS

The invention is herein described, somewhat diagrammatically and by way of example only, with reference to the accompanying drawings, in which.

DESCRIPTION OF THE PREFERRED EMBODIMENTS

Figure 1:
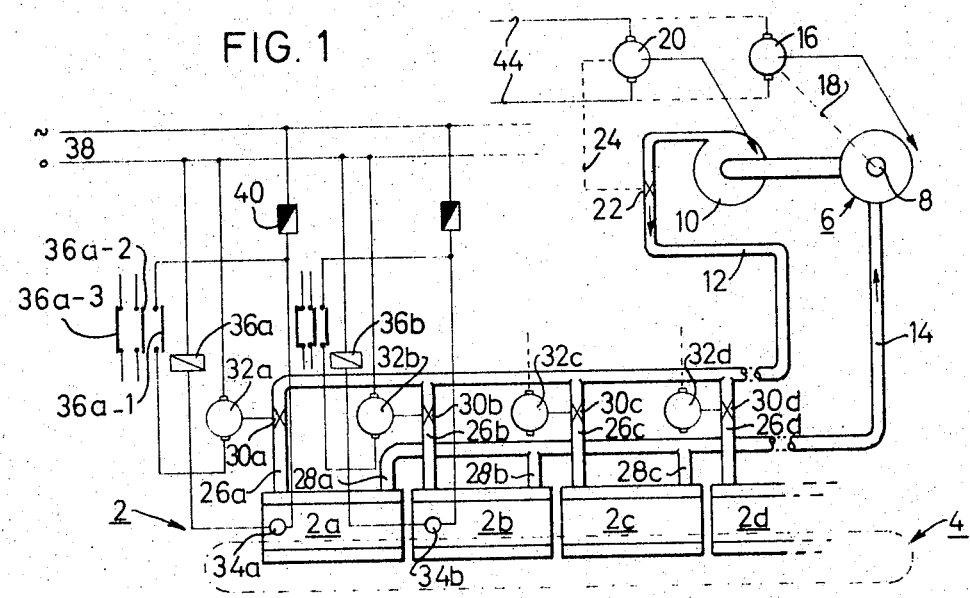
FIG. 1 is a diagrammatic view of an industrial baking oven constructed in accordance with the present invention.

With reference first to FIG. 1, there is diagrammatically shown a baking oven tunnel 2 divided into a plurality of zones or sections, e.g., sections 2a–2d. The dough is transported (from left to right) through the zones by means of an endless conveyor belt 4. Hot gasses are supplied by means of a central heat source, diagrammatically indicated at 6, including a combustion chamber and a burner 8 supplying thereto fuel and air. The hot gasses are circulated from the heat source 6 through the zones by means of a fan 10, the hot gasses passing through an inlet duct 12 and being returned to the combustion chamber of the central heat source by return duct 14. The amount of heat generated by the burner is controlled by a servomotor 16 through a coupling system 18 by which the rate of feed of fuel and/or air may be varied. A second servomotor 20, called a circulation-control servomotor, may optionally be included to control the rate of circulation of the hot gasses to the zones by adjusting a louvre baffle 22 in duct 12 by means of a coupling 24.

Each of the oven zones includes an inlet duct (26a–26d) connected to main duct 12 and an outlet duct (28a–28c) connected to return duct 14. A damper (30a–30d) is provided in each of the inlet ducts, each damper being driven by a servomotor (32a–32d) to control the amount of heated gasses supplied to its respective zone. The dampers could of course be in the outlet ducts (28a–28d) instead of the inlet ducts, or in other locations.

Each zone also includes a thermostatic switch (e.g. 34a, 34b) which is normally closed but opens when the temperature of its respective zone exceeds a predetermined one. Each thermostatic switch is connected in series with a relay (36a for section 2a) connected to power source 38 through a fuse 40. Relay 36a is provided with three sets of contacts, namely contacts 36a–1, 36a–2, and 36a–3. Contacts 36a–1 are closed when the relay is unenergized and are in series with servomotor 32a for driving the damper 30a in section 2a. Contacts 36a–2 are also closed when the relay is unenergized and are in the circuit for controlling the burner servomotor 16 and the draft servomotor 20. Contacts 36a–3 are also in the latter circuit, but are open when the relay is unenergized. A relay, like relay 36a, is provided for each zone of the baking oven.

Figure 2:
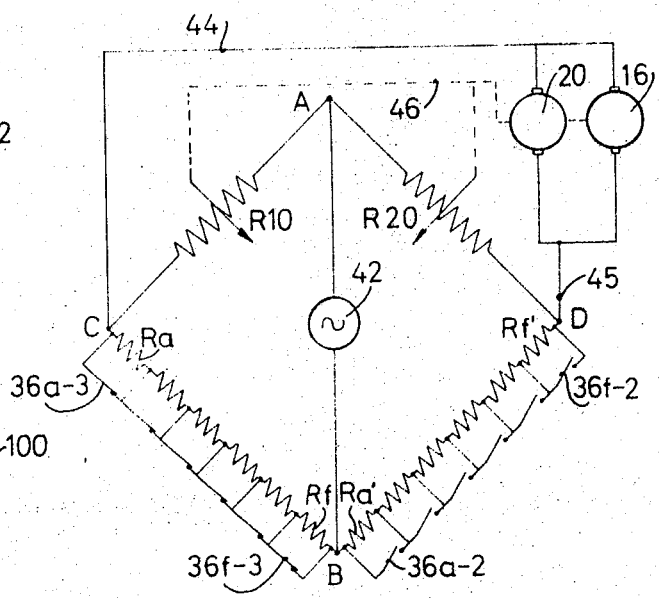

FIG. 2 illustrates the circuit controlled by these relay contacts. This circuit is in the form of an electrical bridge network in which two arms of the bridge are constituted by a series of resistors Ra–Rf and Ra'–Rf', respectively, across which are connected the relay contacts. The other arms of the bridge are constituted by adjustable resistors R10 and R20. A voltage source is connected between the junctions A and B of two sides of the bridge, and the output of the bridge, taken between points C and D, is applied by conductors 44 and 45 to burner servomotor 16 and circulation-control servomotor 20.

The operation of the system will be apparent from the foregoing description. The thermostatic switches (e.g. 34a) for each zone are set so as to open when the temperature of its respective zone exceeds the preselected maximum. The bridge illustrated in FIG. 2 is balanced so long as no zone becomes overheated, and therefore there is no output to servomotor 16 or 20. As soon as a zone becomes overheated, its thermostatic switch opens, thus de-energizing its respective relay (e.g. 36a), causing the following to occur: the first set of contacts of the relay (e.g. 36a–1) are closed, thus actuating motor (e.g. 32a) which drives the damper (e.g. 30a) for its respective zone toward the closed position so as to reduce the amount of hot gasses introduced into that zone. The remaining two sets of contacts (e.g. 36a–2 and 36a–3) of the relay are actuated whereupon one set of contacts (e.g. 36a–2) shorts out one resistor (e.g. Ra') from one arm of the bridge of FIG. 2, and the other set of contacts (e.g. 36a–3) introduces a resistor (e.g. Ra) into the other arm of the bridge. This causes the bridge to become unbalanced, producing an output across lines 44 and 45, which energizes servomotors 16 and 20. Servomotor 16 adjusts the rate of feed of the fuel and air by the burner 8 to reduce the amount of heat produced by the burner, and servomotor 20 adjusts louvre baffles 22 to reduce the amount of draft produced by fan 10. Servomotors 16 and 20, or either one alone, varies resistors R10 and R20 in the bridge through coupling 46 in order to rebalance the bridge, so that these motors operate until the bridge is rebalanced and then stop. This condition continues until the bridge is again unbalanced by one of the thermostatic switches.

It will be seen that in the circuit illustrated in FIG. 2, when the resistance of one of the arms (e.g., that including resistors (Ra . . . Rf) is changed by the operation of one of the relays, the resistance of the corresponding arm (e.g., that including Ra' . . . Rf') will be changed in the opposite direction. Thus the unbalance of the bridge will be amplified. If desired, each pair of resistors may have the same value, e.g. 27 ohms each, whereupon the resistance of both arms together will always remain the same.

Figure 3:
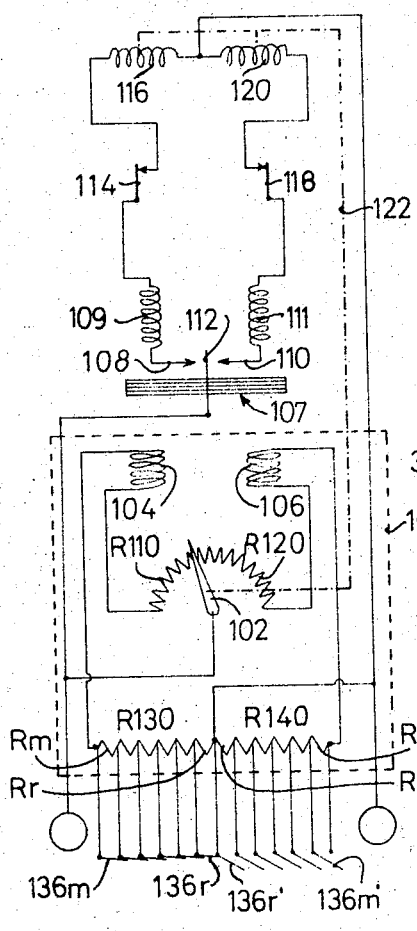
FIGS. 2 and 3 are schematical diagrams of portions of electrical circuits that may be used in the baking oven of FIG. 1.

FIG. 3 illustrates a further circuit that may be used. In FIG. 3, a bridge is formed by four arms R110, R120, R130 and R140. The two arms R110 and R120 are set by means of a movable tap 102. The remaining two arms R130 and R140 are controlled by the operation of the thermostatic devices including switching relays corresponding to relays 36a, 36b, . . . in FIG. 1. The individual resistors in arm R130 are indicated Rm . . . Rr; and these are individually controlled by their respective relay contacts 136m . . . 136r, all of which contacts are normally closed. The individual resistors in arm R140 are indicated as Rm' . . . Rr'; and these are individually controlled by their respective relay contacts 136m' . . . 136r', all of which contacts are normally open. Thus, when one of the thermostatic devices (e.g. 34a in FIG. 1) is actuated, this will cause the opening of its relay contacts 136m and the closing of its relay contacts 136m', which in turn throws in resistor Rm in arm R130 and shunts out resistor Rm' in arm R140. The bridge is thus unbalanced in the same manner as in FIG. 2. The output is sensed by a pair of relay coils 104 and 106 and a balancing relay 107, the two coils being in series with the output terminals of the bridge. The balancing relay has a pair of fixed contacts 108 and 110 and a movable contact 112 adapted to engage one or the other of the fixed contacts in accordance with the current flowing through coils 104 and 106. Contact 108 is in turn connected through a holding coil 109 and a limit switch 114 to one winding 116 of a servomotor, and contact 110 is connected through a holding coil 111 and another limit switch 118 to second winding 120 of the servomotor. Energization of winding 116 causes the motor to rotate in one direction, and energization of the other winding 120 causes the motor to rotate in the opposite direction. The two windings may be in a burner control servomotor and/or in a circulation-control servomotor, comparable to servo motors 16 and 20 in FIG. 1. Limit switches 114 and 118 are included so as to disable the operation of the servomotor when either the upper or lower limit is reached. The bridge is automatically rebalanced by a coupling, schematically illustrated at 122, between the servomotor and movable tap 102.

It will be appreciated that the novel features of the invention can be used in a system wherein the servomotor controlled by the thermostatic devices controls either the feed of the fuel, or the supply of air, or both. The provision of the circulation-control servomotor 20 is optional. Also, besides electrical servomotors there could be used other known types, e.g. hydraulic. Further, the control circuit need not include relays, the thermostatic devices directly switching the resistors within the bridge circuit or controlling solid-state switching devices. In addition, not all the zones or sections in the baking oven need be controlled or need contain thermostatic switches controlling the central heat supply. Still further, there could be a plurality of central heat supplies, each supplying hot gasses to two or more sections.

Additional changes, variations and applications of the ilulstrated embodiments of the invention may be made.

I claim:

1. A baking oven comprising a heated tunnel divided into a plurality of zones, means for transporting the media to be heated through said zones, a central burner for supplying hot gases from a central source to at least two zones, means for circulating the hot gases from said central source to said zones, regulating means for regulating the flow of hot gases to each of said zones, a temperature sensitive device in each of said zones, and a control circuit including zone-control means for automatically controlling each of said zone regulating means in response to the temperature sensed in its respective zone, said control circuit further including burner control means for controlling said central burner so as to automatically regulate the quantity of the hot gases produced thereby.

2. A baking oven as defined in claim 1, wherein said control circuit includes a bridge, there being a pair of impedances controlled by the temperature sensitive device in each respective zone, one of said pair of impedances being normally included in one arm of said bridge and being shunted therefrom by the actuation of the temperature sensitive device of its respective zone, the other of said pair of impedances being normally shunted from a second arm of said bridge and being switched into said second arm upon said actuation of the temperature sensitive device in its respective zone.

3. A baking oven as defined in claim 2, wherein said burner control means includes a servomotor controlled by said bridge.

4. A baking oven as defined in claim 3, further including a servomotor controlled by said bridge and controlling said circulating means for the hot gasses.

References Cited

UNITED STATES PATENTS

| | | |
|---|---|---|
| 1,880,536 | 10/1932 | Wadman. |
| 2,202,995 | 6/1940 | Porwancher _____ 237—2 |
| 3,218,671 | 11/1965 | Justus et al. _____ 18—12 |

WILLIAM E. WAYNER, Primary Examiner

U.S. Cl. X.R.

236—78; 237—2; 263—36